US012296726B2

(12) United States Patent
McHugh et al.

(10) Patent No.: US 12,296,726 B2
(45) Date of Patent: May 13, 2025

(54) CHILD RESTRAINT (71) Applicant: Dorel Juvenile Group, Inc., Foxboro, MA (US)

(72) Inventors: William P. McHugh, Norfolk, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 230 days.

(21) Appl. No.: 17/880,036

(22) Filed: Aug. 3, 2022

(65) Prior Publication Data

US 2023/0043067 A1   Feb. 9, 2023

Related U.S. Application Data (60) Provisional application No. 63/230,194, filed on Aug. 6, 2021.

(51) Int. Cl.
*B60N 2/28* (2006.01)

(52) U.S. Cl.
CPC ......... *B60N 2/2857* (2013.01); *B60N 2/2821* (2013.01); *B60N 2/2827* (2013.01); *B60N 2/2869* (2013.01)

(58) Field of Classification Search
CPC ... B60N 2/2821; B60N 2/2869; B60N 2/2827
See application file for complete search history.

(56) References Cited

U.S. PATENT DOCUMENTS

| 6,260,920 | B1* | 7/2001 | Tolfsen | B60N 2/143 |
| | | | | 297/256.16 |
| 6,318,807 | B1 | 11/2001 | Perego | |
| 7,338,122 | B2 | 3/2008 | Hei | |
| 7,559,606 | B2 | 7/2009 | Hei | |
| 7,575,276 | B1 | 8/2009 | Henry | |
| 7,735,921 | B2 | 6/2010 | Hutchinson | |
| 7,770,970 | B2 | 8/2010 | Hei | |
| 7,828,381 | B2 | 11/2010 | Barger | |
| 7,887,129 | B2 | 2/2011 | Hei | |
| 8,235,465 | B2 | 8/2012 | Hei | |
| 8,256,841 | B2 | 9/2012 | Hei | |
| 8,317,265 | B2 | 11/2012 | Hutchinson | |
| 8,474,907 | B2 | 7/2013 | Weber | |
| 8,511,749 | B2 | 8/2013 | Hei | |
| 9,090,182 | B2 | 7/2015 | Rabeony | |
| 9,487,111 | B2 | 11/2016 | Lake | |
| 10,457,168 | B2 | 10/2019 | Anderson | |
| 10,464,451 | B2 | 11/2019 | Stamper | |
| 10,583,756 | B2 | 3/2020 | Anderson | |
| 10,688,892 | B2 | 6/2020 | Anderson | |
| 10,710,478 | B2 | 7/2020 | Reaves | |

(Continued)

OTHER PUBLICATIONS

Office Action (Non-Final Rejection) dated Dec. 8, 2023 for U.S. Appl. No. 17/882,031 (pp. 1-10).

*Primary Examiner* — Timothy J Brindley
(74) *Attorney, Agent, or Firm* — Barnes & Thornburg LLP (57) ABSTRACT

A child restraint includes a seat base and a juvenile seat adapted to mount to the seat base. The seat base is adapted to rest on a vehicle seat. The juvenile seat is adapted mount to the seat base to secure the juvenile seat to the vehicle seat using the seat base. The juvenile seat includes a seat shell formed to include a child-receiving space.

17 Claims, 7 Drawing Sheets

(56) References Cited

U.S. PATENT DOCUMENTS

| | | | |
|---|---|---|---|
| 11,420,540 B2 | 8/2022 | Williams | |
| 11,427,114 B2 | 8/2022 | Keegan | |
| 11,565,612 B2* | 1/2023 | Williams | B60N 2/2824 |
| 2008/0224516 A1* | 9/2008 | Vegt | B60N 2/2887 |
| | | | 297/256.16 |
| 2016/0176320 A1* | 6/2016 | Williams | B60N 2/2821 |
| | | | 297/256.13 |
| 2019/0077282 A1 | 3/2019 | Reaves | |
| 2019/0135142 A1 | 5/2019 | Jung | |
| 2021/0237626 A1 | 8/2021 | Longenecker | |
| 2022/0048415 A1 | 2/2022 | Keegan | |
| 2022/0212575 A1 | 7/2022 | Williams | |
| 2022/0219581 A1 | 7/2022 | Brunick | |
| 2022/0242288 A1* | 8/2022 | Po-Jung | B60N 2/60 |
| 2022/0355713 A1 | 11/2022 | Longenecker | |
| 2023/0256875 A1* | 8/2023 | Zhang | B60N 2/2872 |
| | | | 297/256.12 |

* cited by examiner

CHILD RESTRAINT

PRIORITY CLAIM

This application claims priority under 35 U.S.C. § 119(e) to U.S. Provisional Application Ser. No. 63/230,194, filed Aug. 6, 2021, which is expressly incorporated by reference herein.

BACKGROUND

The present disclosure relates to child restraints, and particularly to child restraints including a seat base. More particularly, the present disclosure relates to a child restraint including a seat base and a juvenile seat that is movable relative to the seat base.

SUMMARY

According to the present disclosure, a child restraint includes a seat base adapted to rest on and secure to a vehicle seat and a juvenile seat configured to mount removably to the seat base. The seat base and the juvenile seat cooperate to secure a child to the child restraint for transportation in the vehicle.

In illustrative embodiments, the juvenile seat includes a seat shell formed to include a child-receiving space and a seat-shell pedestal coupled to a bottom end of the seat shell. The juvenile seat is attachable to the seat base by inserting the seat-shell pedestal into a pedestal-receiving space formed in the seat base. The seat-shell pedestal is sized relative to the seat base to extend into and be removed from the pedestal-receiving space only when the juvenile seat is in a sideways orientation relative to the seat base.

In illustrative embodiments, the child restraint includes a juvenile-seat release system which controls removal of the juvenile seat from the seat base. The juvenile-seat release system includes a first juvenile-seat retainer unit coupled to a first lateral side of the seat base, a second juvenile-seat retainer unit coupled to a second lateral side of the seat base, and a motion-transfer link interconnecting the first and second juvenile-seat retainer units. Either of the first and second juvenile-retainer units may be actuated by a user to separate the juvenile seat from the seat base when the juvenile seat is in the sideways orientation. The motion-transfer link synchronizes movement of both juvenile-seat retainer units so that only one juvenile seat-retainer unit needs to be actuated by the user.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figures 1, 2:
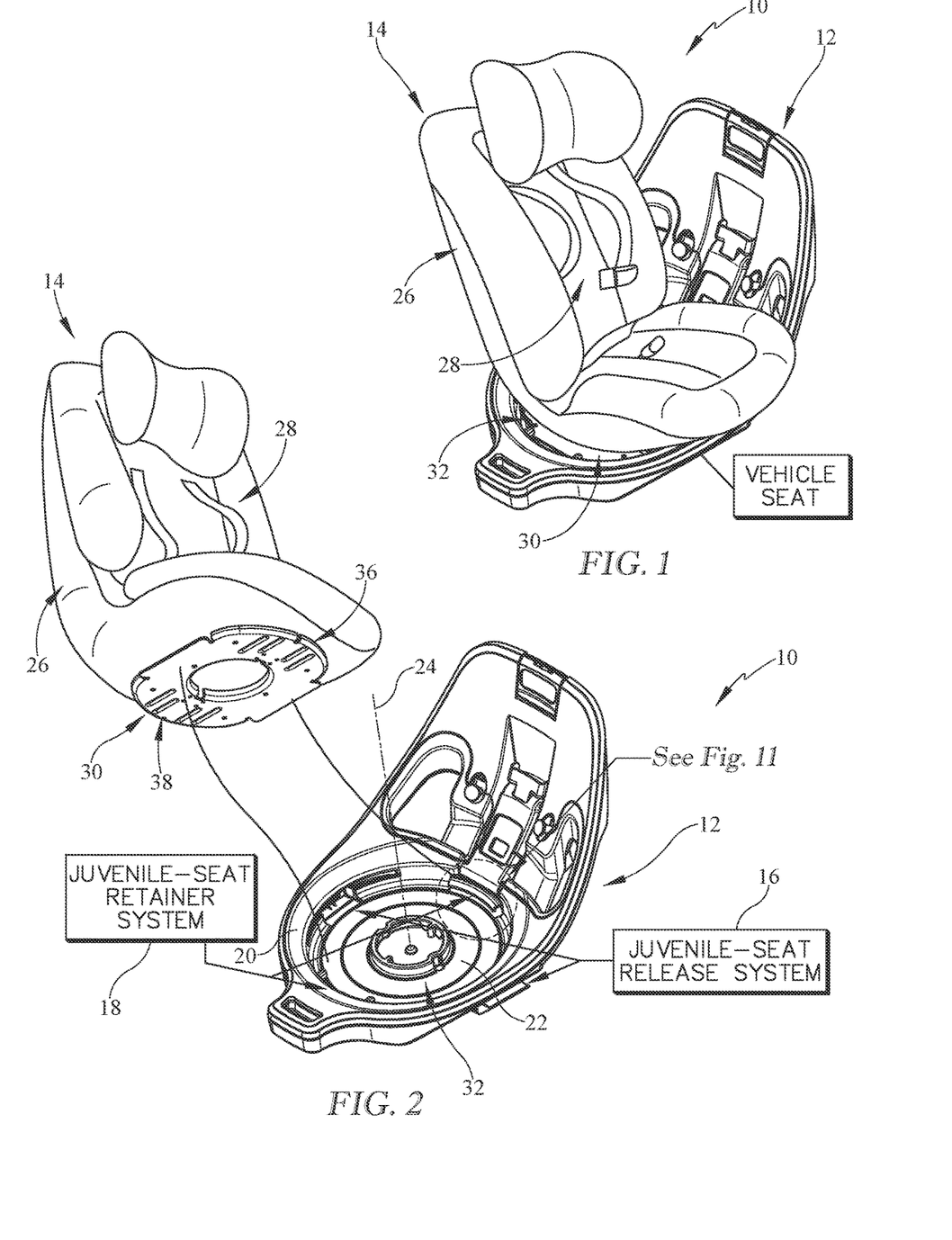
FIG. 1 is a perspective view of a child restraint in accordance with the present disclosure including a seat base adapted to rest on and secure to a vehicle seat and a juvenile seat configured to mount removably to the seat base in a sideways, release orientation, as suggested in FIG. 2, and subsequently rotate to a forward facing orientation or a rearward facing orientation where the juvenile seat is retained to the seat base and blocked from being removed from the seat base by a juvenile-seat retainer system and a juvenile-seat release system, as shown in FIG. 2.
FIG. 2 is a perspective view of the child restraint of FIG. 1, showing the juvenile seat removed from the seat base after being returned to the sideways, release orientation and showing that the juvenile seat includes a seat shell and a seat-shell pedestal coupled to a bottom of the seat shell and sized to fit within a pedestal-receiving space formed in the seat base and which is retained by the juvenile-seat retainer system when the juvenile seat is in the forward and rearward orientations, as suggested in FIGS. 3A and 3B, and which is releasable by the juvenile-seat release system when the juvenile seat is in a sideways orientation, as suggested in FIGS. 4A and 4B.
Figures 3A, 3B:
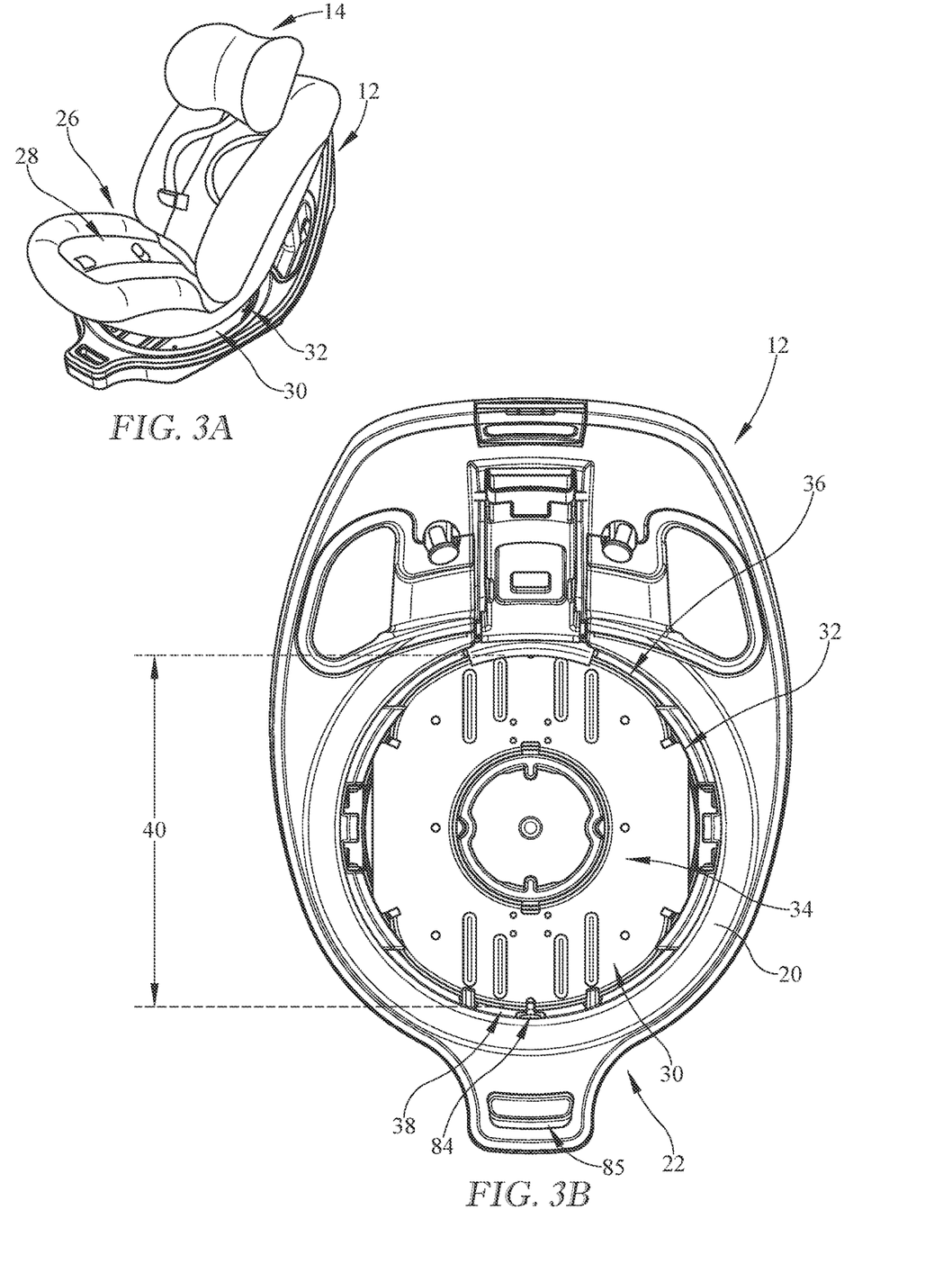
FIG. 3A is a perspective view of the child restraint of FIG. 1, showing the juvenile seat in the forward facing orientation relative to the seat base.
FIG. 3B is a top plan view of the seat base of FIG. 3A with the seat-shell pedestal received in the pedestal-receiving space in the forward facing orientation and all other portion of the juvenile seat removed to show that the seat-shell pedestal has a length in a front-to-back direction of the juvenile seat which positions portions of the seat-shell pedestal between front and rear vertical-motion restrictors, included in the juvenile-seat retainer system, in the forward and rearward facing orientations.

A child restraint 10 includes a seat base 12 adapted to rest on a vehicle seat 11 and a juvenile seat 14 adapted to mount to the seat base 12 to secure the juvenile seat 14 to the vehicle seat 11 as shown in FIGS. 1 and 2. The child restraint 10 further includes a juvenile-seat release system 16 and a juvenile-seat retainer system 18. The juvenile-seat release system 16 and the juvenile-seat retainer system 18 cooperate to secure the juvenile seat 14 to the seat base 12 while the juvenile seat 14 is in a travel orientation, as shown in FIG. 3A, and to allow for separation of the juvenile seat 14 from the seat base 12 when the juvenile seat 14 is in a sideways, release orientation, as shown in FIGS. 1 and 2.

The seat base 12 includes a perimeter rim 20 and a seat-base foundation 22 coupled to the perimeter rim 20. The juvenile seat 14 is rotatable about a vertical pivot axis 24 between a forward-facing orientation and a rearward-facing orientation. The juvenile seat 14 is removable from the seat base 12 through use of the juvenile-seat release system 16. The juvenile seat 14 is retained to the seat base 12 through use of the juvenile-seat retainer system 18 and/or the juvenile-seat release system 16.

The juvenile seat 14 includes a seat shell 26 formed to include a child-receiving space 28 and a seat-shell pedestal 30 fixed to a bottom end of the seat shell 26 as shown in FIG. 2. The seat shell 26 is configured to support a child within the child-receiving space 28 for transportation within the vehicle. The seat-shell pedestal 30 is configured to be received within a pedestal-receiving space 32 defined by the perimeter rim 20 and the seat-base foundation 22 of the seat base 12.

The seat-shell pedestal 30 includes a pedestal base 34 and two vertical-motion restricting flanges 36, 38 coupled to the pedestal base 34 as shown in FIGS. 3A-4B. The two vertical-motion restricting flanges 36, 38 are coupled to the pedestal base 34 and extend outward from the pedestal base 34. The seat-shell pedestal 30 has a length 40 that extends in a front-to-back direction (longitudinal direction) relative to the seat shell 26 and a width 42 that extends in a side-to-side direction (lateral direction) perpendicular to the front-to-back direction 40. The length 40 is greater than the width 42 to allow installation of the juvenile seat in a sideways orientation, as will be explained in more detail below.

Figures 4A, 4B:
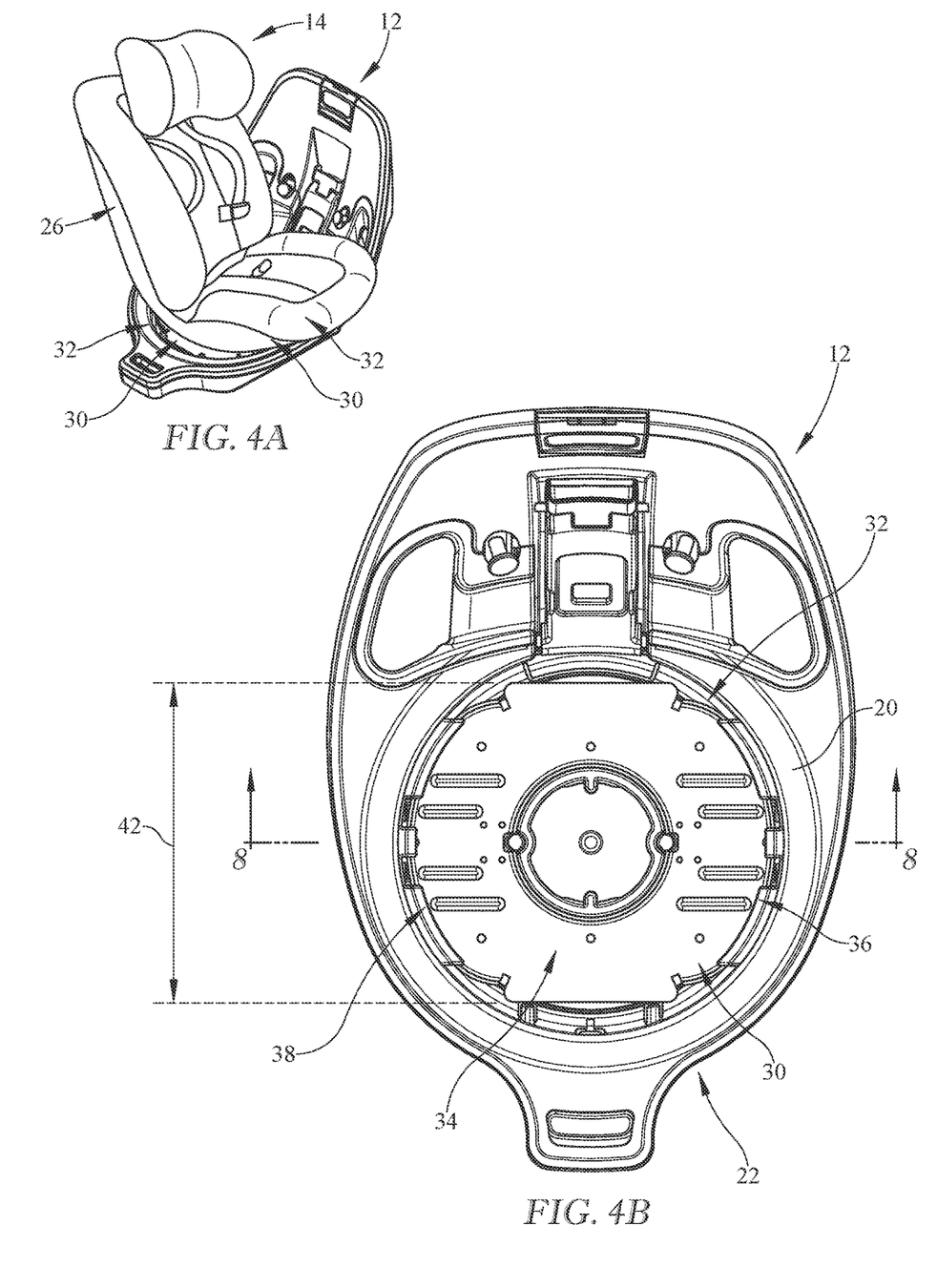
FIG. 4A is a perspective view of the child restraint of FIG. 1, showing juvenile seat in the sideways orientation relative to the seat base.
FIG. 4B is a top plan view of the seat base of FIG. 4A with the seat-shell pedestal received in the pedestal-receiving space in the sideways orientation and all other portions of the juvenile seat removed to show that the seat-shell pedestal has a width in a side-to-side direction of the juvenile seat which removes all portions of the seat-shell pedestal from beneath the front and rear vertical-motion restrictors in the sideways facing orientations to allow separation of the juvenile seat from the seat base.

A first vertical-motion restricting flange 36 is circumferentially aligned with a front of the seat shell 26 while a second vertical-motion restricting flange 38 is circumferentially aligned with a rear of the seat shell 26 as suggested in FIGS. 3B and 4B. The length 40 is defined by the pedestal base 34 and both the first and second vertical-motion restricting flanges 36, 38. The vertical-motion restricting flanges 36, 38 are arcuate to provide the seat-shell pedestal 30 with a radius of curvature at forward and rear ends thereof. The vertical-motion restricting flanges 36, 38 do not extend along lateral sides of the seat shell 26. Thus, the width 42 is defined only by the pedestal base 34. These dimensions 40, 42 allow the seat pedestal 30 to be inserted into and removed from the pedestal-receiving space 32 while the juvenile seat 14 is in a sideways orientation as suggested in FIGS. 2 and 11 using juvenile-seat release system 16. These dimensions 40, 42 also block removal of the seat pedestal 30 from the pedestal receiving space 32 when (i) the juvenile seat 12 is in the forward facing orientation or rearward facing orientation, and (ii) prior to actuation of the juvenile-seat release system 16 when the juvenile seat 14 is in a sideways orientation.

Figure 5:
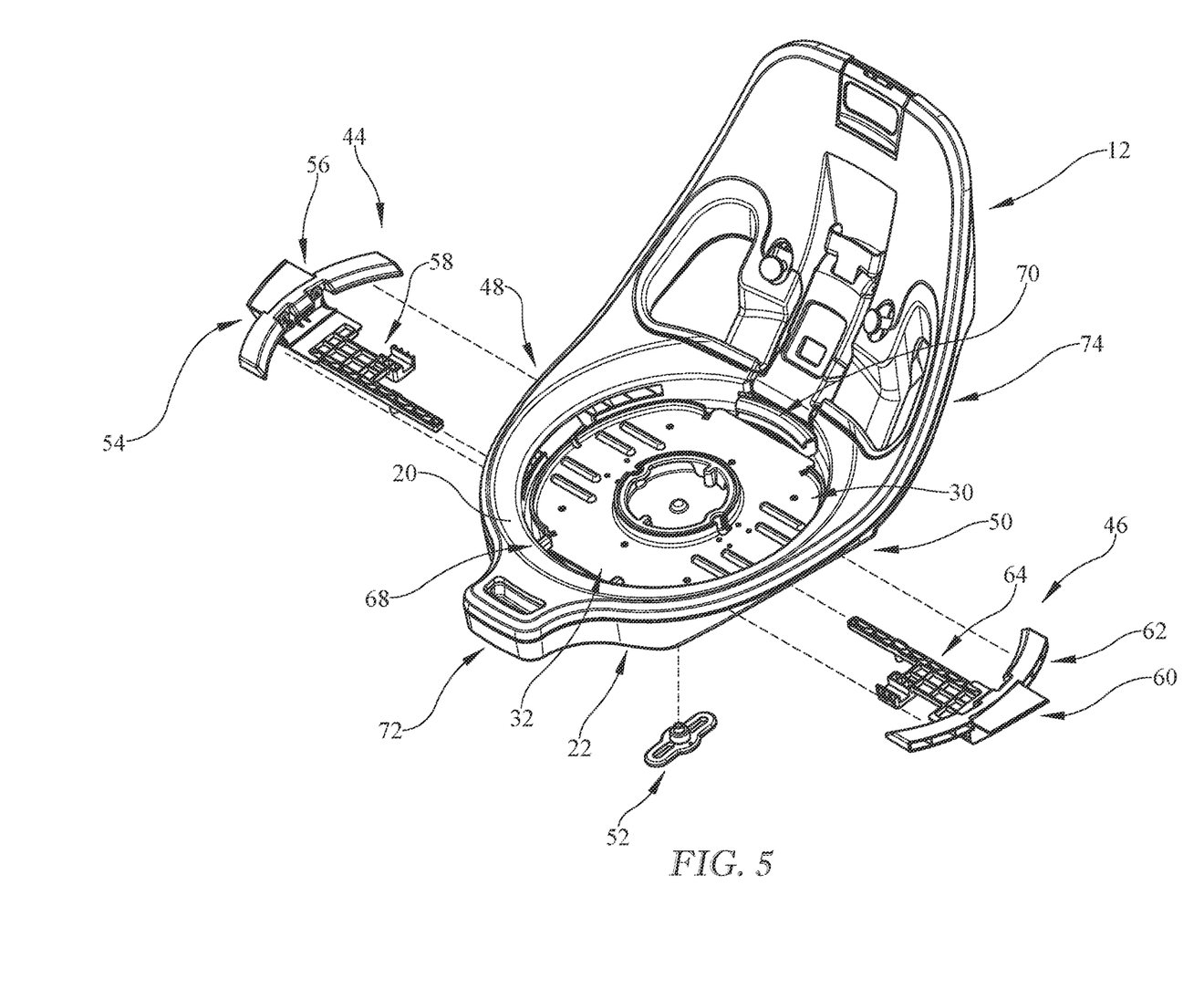
FIG. 5 is an exploded assembly view of the seat base and the juvenile-seat release system of FIG. 1 showing that the juvenile-seat release system includes left and right releasable juvenile-seat retainer units which can be actuated in unison with one another, as suggested in FIGS. 7-9, to allow removal of the seat-shell pedestal from the pedestal-receiving space, as suggested in FIG. 11.
Figure 6:
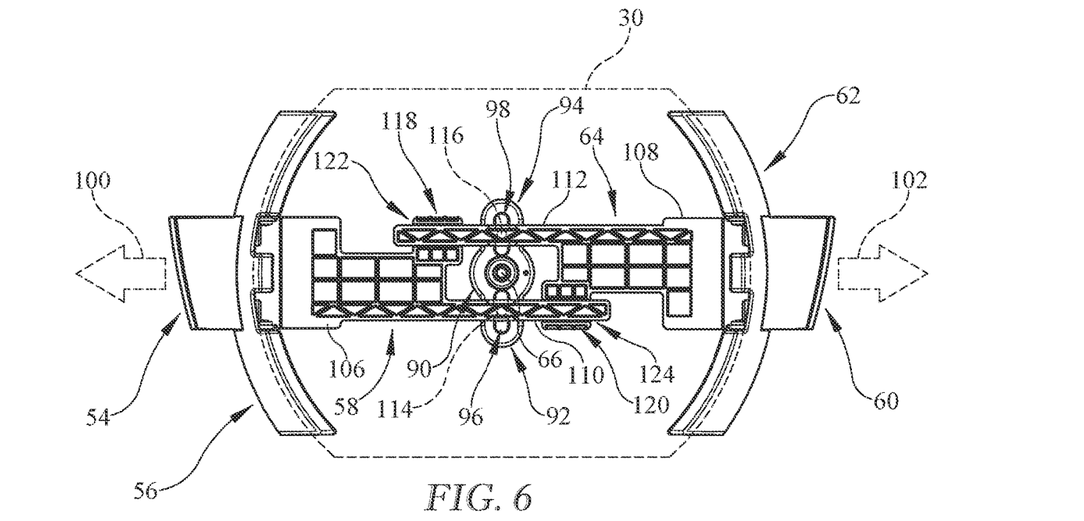
FIG. 6 is a top plan view of the juvenile-seat release system showing that the juvenile-release system further includes a motion-transfer link arranged in a locked position and interconnecting the left and right juvenile-seat retainer units to synchronize movement of both juvenile-seat retainer units when only one retainer unit is actuated by a user.
Figure 7:
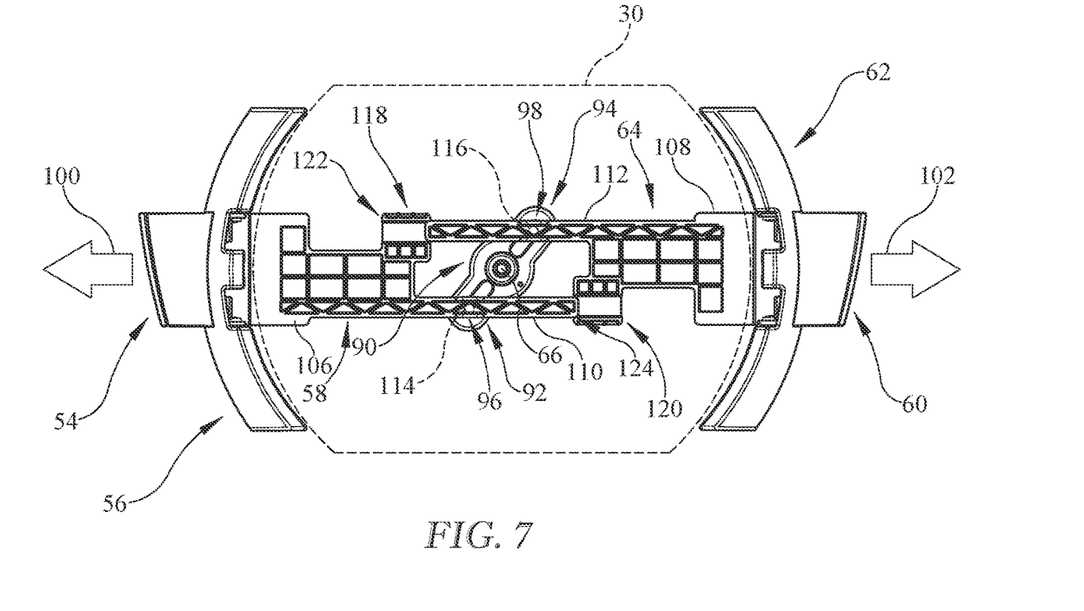
FIG. 7 is a top plan view of the juvenile-seat release system showing the motion-transfer link rotated about a link pivot axis to an unlocked position and both juvenile-seat retainer units actuated in opposite directions so that the seat-shell pedestal no longer underlies left and right pedestal-retainer latches, included in the left and right juvenile-seat retainer units, respectively.

The juvenile-seat release system 16 includes a first juvenile-seat retainer unit 44 coupled to a first lateral side 48 of the seat base 12, a second juvenile-seat retainer unit 46 coupled to a second lateral side 50 of the seat base 12, and a motion-transfer link 52 interconnecting the first and second juvenile-seat retainer units 44, 46 as suggested in FIG. 5 and shown in FIGS. 6 and 7. The first and second juvenile-seat retainer units 44, 46 protrude inwardly away from the perimeter rim 20 and into the pedestal-receiving space 32 toward motion-transfer link 52 and cooperate to retain the seat pedestal 30 in the pedestal-receiving space 32. The motion-transfer link 52 synchronizes movement of the first and second juvenile-seat retainer units 44, 46 so that an operator can unlock and remove the juvenile seat 14 from the seat base 12 from either side 48, 50 of the seat base 12. Thus, the juvenile seat 14 can be installed on seat base 12 from either side of the vehicle as well.

Figure 8:
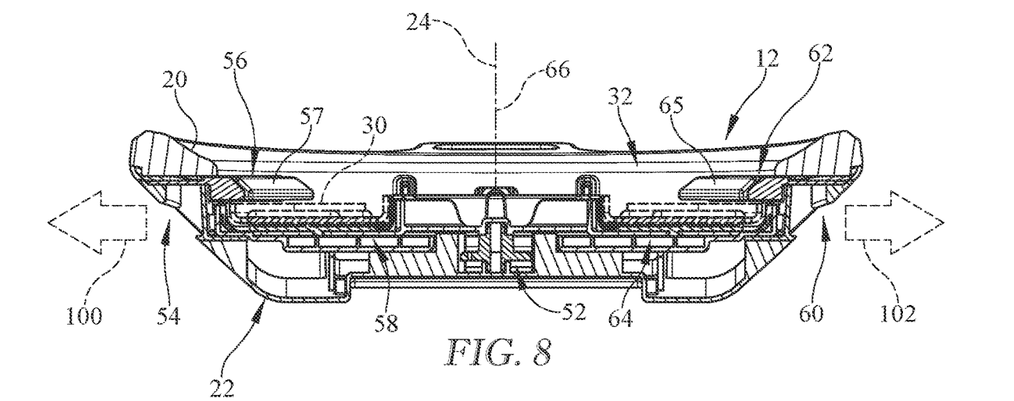
FIG. 8 is a section view of the seat base taken along line 8-8 in FIG. 4B showing an outline of the set-shell pedestal in a sideways orientation relative to the seat base showing vertical-motion restricting flanges includes in the seat-shell pedestal arranged to lie beneath the left and right pedestal-retainer latches prior to the juvenile-seat release system being actuated as shown in FIG. 9.
Figure 9:
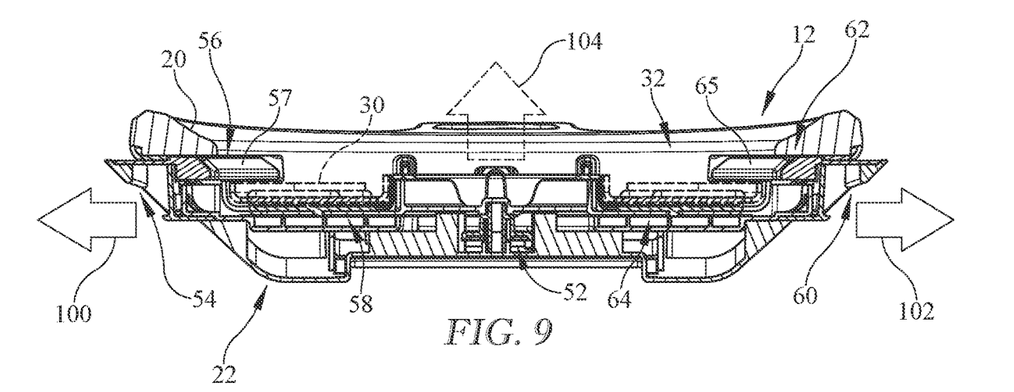
FIG. 9 is a section view similar to FIG. 8 showing the juvenile-seat release system actuated by pulling one of the left and right retainer units in a first outward direction away from the seat base and showing that movement of one of the left and right retainer units in the first outward direction causes a reciprocal movement of the other of the first and second retainer units in a second outward direction opposite the first outward direction.

The first and second juvenile-seat retainer units 44, 46 are moveable between a locked configuration, as shown in FIGS. 6 and 8, and an unlocked configuration, as shown in FIGS. 7 and 9. In the locked configuration, each of the first and second juvenile-seat retainer units 44, 46 are arranged to extend into the pedestal-receiving space 32. In the locked configuration, the first and second juvenile-seat retainer units 44, 46 are arranged to lie between the bottom end of the seat shell 26 and the seat-shell pedestal 30 to block removal of the seat-shell pedestal 30 from the pedestal-receiving space 32. In the unlocked configuration, the first and second juvenile-seat retainer units 44, 46 are at least partially withdrawn from the pedestal-receiving space 32. In the unlocked configuration, the first and second juvenile-seat retainer units 44, 46 are also removed from between the bottom end of the seat shell 26 and the seat-shell pedestal 30 so that the seat-shell pedestal is free to be removed from the pedestal-receiving space 32. In the illustrative embodiment, the first and second juvenile-seat retainer units 44, 46 slide relative to the seat base 12 between the locked and unlocked positions.

Both the first and second juvenile-seat retainer units 44, 46 are moved from the locked configuration to the unlocked configuration upon actuation of only one of the first and second juvenile seat retainer units 44, 46. The first juvenile-seat retainer unit 44 includes a first release handle 54, a first pedestal-retainer latch 56, and a first handle extension 58. The first release handle 54 is coupled to the first side 48 of the seat base 12 and is configured to be actuated by a user. The first pedestal-retainer latch 56 is coupled with the first release handle 54 and is adapted to engage with the seat-shell pedestal 30. The first handle extension 58 is coupled with and interconnects the first release handle 54 and the motion-transfer link 52 to move therewith. Actuation of the first release handle 54 in a first direction 100 away from the seat base 12 causes the first pedestal-retainer latch 56 to retract from the pedestal-receiving space 32 and from between the bottom of the seat shell 26 and the sheet-shell pedestal 30.

Similarly, the second juvenile-seat retainer unit 46 includes a second release handle 60, a second pedestal-retainer latch 62, and a second handle extension 64 as shown in FIGS. 6-10. The second release handle 60 is coupled to the second side 50 of the seat base 12 and is configured to be actuated by a user. The second pedestal-retainer latch 62 is coupled with the second release handle 60 and is configured to engage with the seat-shell pedestal 30 to block removal of the juvenile seat 14 from the seat base 12. The second handle extension 64 is coupled with and interconnects the second release handle 62 and the motion-transfer link 52 to move therewith. Actuation of the second release handle 60 in a second direction 102 away from the seat base 12 and opposite the first direction 100 causes the second pedestal-retainer latch 62 to retract from the pedestal-receiving space 32 and from between the bottom of the seat shell 26 and the sheet-shell pedestal 30.

Figure 10:
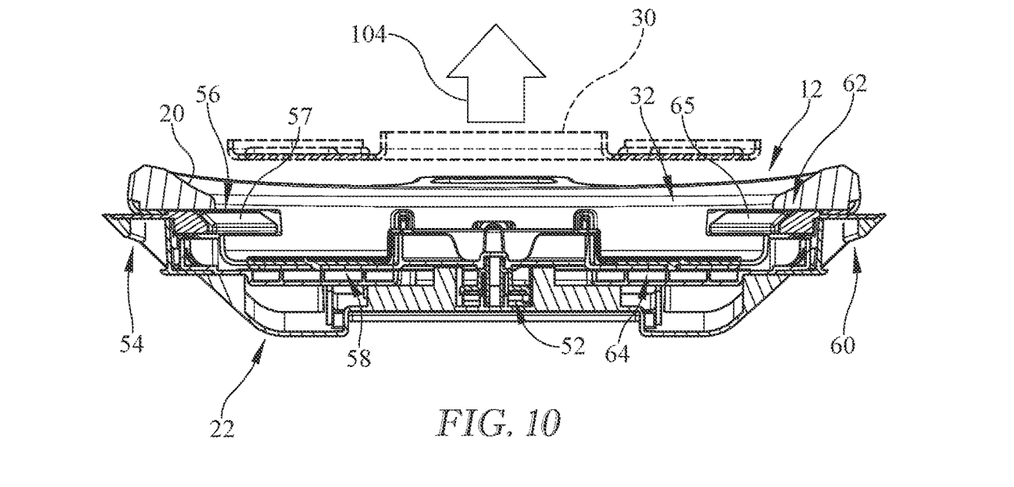
FIG. 10 is a section view similar to FIG. 9 showing the seat-shell pedestal being removed from the pedestal-receiving space in a vertical direction after the left and right retainer units are actuated.

The motion-transfer link 52 is configured to rotate about a link pivot axis 66 in response to actuation of one of the first or second release handle 54, 60 in the respective first or second direction 100, 102 as shown in FIGS. 8-10. Upon rotation about the link pivot axis 66, the motion-transfer link 52 pushes the other of the first and second juvenile-seat retainer units 44, 46 radially outward relative to the link pivot axis 66 away from the pedestal-receiving space 32. Rotation of the motion-transfer link 52 is caused by application of an actuation force (i.e. a pulling force) on one of the first and second juvenile-seat retainer units 44, 46. Application of the actuation force to only one of the first and second juvenile-seat retainer units 44, 46 causes both of the first and second juvenile-seat retainer units 44, 46 to move simultaneously to the unlocked configuration via the motion-transfer link 52.

For example, upon pulling the first release handle 54 in the first direction 100 radially outward from the link pivot axis 66, the motion-transfer link 52 rotates about the link pivot axis 66. Simultaneously, the motion-transfer link 52 pushes the second handle extension 64 radially outward from the link pivot axis 66 in the second direction 102. With this motion, the second pedestal-retainer latch 62 retracts radially outward out of the pedestal-receiving space 32 simultaneously with the first pedestal-retainer latch 56. Once both of the pedestal-retainer latches 54, 62 are retracted, the seat-shell pedestal 30 of the juvenile seat 14 may be lifted away from the seat base 12 out of the pedestal-receiving space 32 in a vertical direction 104 as shown in FIG. 10. In the illustrative embodiment, the vertical pivot axis 24 of the juvenile seat 14 is parallel with the link pivot axis 66; however, in other embodiments the link pivot axis 66 may be oriented at an angle relative to vertical pivot axis 24 and/or offset from the vertical pivot axis 24.

The motion-transfer link 52 rotates in a first circumferential direction about the vertical pivot axis 24 to an unlocked position, as shown in FIG. 7, upon actuation of one of the first and second release handles 54, 60 away from the link pivot axis 66. When one of the first and second release handles 54, 60 is released, the motion-transfer link 52 rotates in a second, opposite circumferential direction to a locked position as shown in FIG. 6. The motion-transfer link 52 is biased to rotate in the second circumferential direction in the illustrative embodiment to automatically lock the seat-shell pedestal 30 within the pedestal-receiving space 32 when juvenile seat 14 is attached to seat base 12.

The motion-transfer link 52 includes a rotation hub 90 configured to rotate about link pivot axis 66, a first arm 92 extending radially outward from the rotation hub 90, and a second arm 94 extending radially outward from the rotation hub opposite the first arm 92 as shown in FIGS. 6 and 7. The rotation hub 90 is mounted to the seat-base foundation 22 for pivotable movement relative to the seat-base foundation 22 between the locked position and the unlocked position. The first arm 92 is formed to include a first pin slot 96 and is coupled to the first handle extension 58 for movement therewith. The second arm 94 is formed to include a second pin slot 98 and is coupled to the second handle extension 64 for movement therewith.

Each handle extension 58, 64 includes a handle mount 106, 108 fixed to a respective release handle 54, 60 for movement therewith, a motion-transfer arm 110, 112 coupled to and extending radially inward from the handle mount 106, 108, and a motion-transfer pin 114, 116 coupled to each respective motion-transfer arm 110, 112. Each pedestal-retainer latch 56, 62 is also coupled to each respective handle mount 106, 108 for movement therewith. Each motion-transfer arm 110, 112 is positioned on a respective side of the link pivot axis 66 to align with a respective arm 90, 92 of the motion-transfer link 52.

Each motion-transfer pin 114, 116 is radially aligned with a respective one of the first and second arms 90, 92 of the motion-transfer link and extends from the respective motion-transfer arm 110, 112 into one of the first and second pin slots 96, 98 of the motion-transfer link 52. The first motion-transfer pin 114 moves radially outward in a first direction upon actuation of the first release handle 54 radially outward away from the first side of the seat base 12. At the same time, the motion-transfer link 52 rotates about the link pivot axis 66 and causes the second arm 92 to push the second motion-transfer pin 116 in an opposite, second direction to cause actuation of the second release handle 60 radially outward away from the second side of the seat base 12.

Each handle extension further includes a motion-transfer arm receiver 118, 120 each defining a respective receiver channel 122, 124. The motion-transfer arm 110 of the first handle extension 58 is received in the receiver channel 124 of the second handle extension 64 and the motion-transfer arm 112 of the second handle extension 64 is received in the receiver channel 122 of the first handle extension 58. The motion-transfer arm receivers guide inward and outward movement of the retainer units 44, 46 relative to one another so that the retainer units 44, 46 only move radially inward and outward relative to the first and second side of the seat base 12.

Each pedestal-retainer latch 56, 62 has a downwardly sloped surface 57, 65 that engages seat-shell pedestal 30 when juvenile seat 14 is installed on seat base 12. Interaction between surfaces 57, 65 and seat-shell pedestal 30 actuates each retainer unit 44, 46 in directions 100, 102 until seat-shell pedestal 30 is lowered past pedestal-retainer latches 56, 62. The pedestal-retainer latches 56, 62 are biased to extend into pedestal-receiving space 32 to retain the seat-shell pedestal 30 to seat base 12.

Once the juvenile seat 14 is installed on seat base 12 to locate the seat-shell pedestal 30 vertically between the seat-base foundation 22 and the first and second pedestal-retainer latches 54, 62, the juvenile seat 14 may be rotated relative to the seat base 12. The juvenile seat 14 is retained to the seat base 12 at any orientation by the first and second pedestal-retainer latches 54, 62 and the juvenile-seat retainer system 18. The juvenile-seat retainer system 18 includes at least one front vertical-motion restrictor 68 and at least one rear vertical-motion restrictor 70. The at least one front vertical-motion restrictor 68 is coupled to the seat base 12 in a fixed position at a forward end 72 of the perimeter rim 20 and extends into the pedestal-receiving space 32. The at least one rear vertical-motion restrictor 70 is coupled to the seat base 12 in a fixed position at a rearward end 74 of the perimeter rim 20 and extends into the pedestal-receiving space 32.

The juvenile seat 14 is rotatable about the vertical pivot axis 24 between two travel orientations and two release orientations. The travel orientations include the forward orientation and the rearward orientation. The release orientations include both sideways orientations (i.e. 90 degrees from the forward and rearward orientations). In the travel orientations, the vertical-motion restrictors 36, 38 are circumferentially aligned with the front and rear vertical-motion restrictors 68, 70. In the travel orientations, the vertical-motion restrictors 36, 38 of the seat-shell pedestal 30 is arranged to lie vertically between a respective one of the front and rear vertical-motion restrictors 68, 70 to block removal of the seat-shell pedestal 30 from the pedestal-receiving space 32 at all times. In the release orientations, the vertical-motion restrictors 36, 38 of the seat-shell pedestal 30 are offset from the front and rear vertical-motion restrictors 68, 70 and are circumferentially aligned with the first and second juvenile-seat retainer units 44, 46. In the release orientations, the seat-shell pedestal 30 is free to be removed from the pedestal-receiving space 32 when the first and second juvenile-seat retainer units 44, 46 are in the unlocked configuration.

Figure 11:
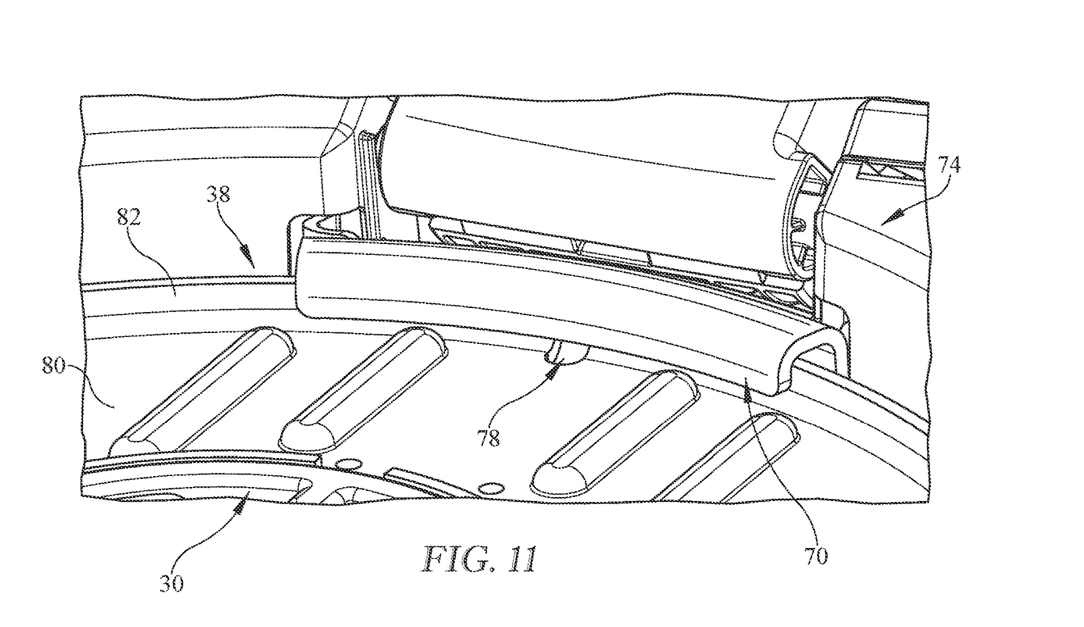
FIG. 11 is an enlarged perspective view of a portion of the juvenile-seat retainer system of FIG. 2 showing the rear vertical-motion restrictor fixed to a rear end of the seat base and protruding inwardly into the pedestal-receiving space to overlap and interlock with the seat-shell pedestal in the forward or rearward facing orientations.
Figure 12:
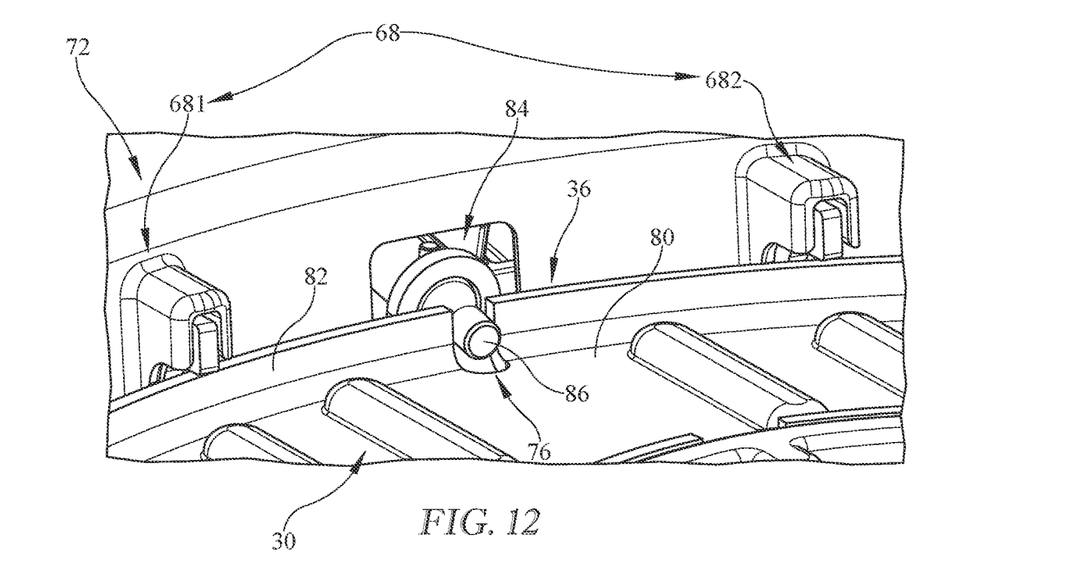
FIG. 12 is an enlarged perspective view of a portion of the juvenile-seat retainer system showing the front vertical-motion restrictor fixed to a front end of the seat base and protruding inwardly into the pedestal-receiving space to overlap with the seat-shell pedestal in the forward or rearward facing orientations, and showing that the juvenile-seat retainer system further includes a circumferential-motion restrictor that engages with the seat-shell pedestal in the forward and rearward facing orientations to block rotation of the juvenile seat about the vertical pivot axis.

The first and second vertical-motion restricting flanges 36, 38 may include a horizontally-extending portion 80 that extends radially outward away from the vertical rotation axis 24 and a vertically-extending portion 82 that extends upwardly away from the horizontally-extending portion 80 toward the bottom of the seat shell 26 as shown in FIGS. 11 and 12. The seat-shell pedestal 30 is formed to include a circumferential-motion restrictor receiver 76, 78 in both the first vertical-motion restricting flange 36 and the second vertical-motion restricting flange 38. The circumferential-motion restrictor receivers 76, 78 are formed into the vertically-extending portion 82 of each vertical-motion restricting flange 36, 38 in the illustrative embodiment. In some embodiments, the circumferential-motion restrictor receivers 76, 78 may be formed into the horizontally-extending portion 80 of each vertical-motion restricting flange 36, 38.

The seat base 12 further includes a circumferential-motion restrictor 84 that extends radially inward from the perimeter rim 22 along the forward end 72 of the seat base 12 as shown in FIG. 12. The circumferential-motion restrictor 84 extends into one of the circumferential-motion restrictor receivers 76, 78 when the juvenile seat 14 is in the forward or rearward orientations. The circumferential-motion restrictor 84 is retractable with a handle 85 to remove a pin 86 from the circumferential-motion restrictor receivers 76, 78. The pin 86 is biased radially inward to automatically extend into circumferential-motion restrictor receivers 76, 78 when the juvenile seat is rotated to the forward or rearward orientation.

The at least one front vertical-motion restrictor 68 includes a first front vertical-motion restrictor 681 and a second front vertical-motion restrictor 682 spaced apart circumferentially from the first front vertical-motion restrictor 681. The circumferential-motion restrictor 84 is positioned circumferentially between the first and second front vertical-motion restrictors 681, 682 as shown in FIG. 12.

The following numbered clauses are contemplated and non-limiting:

Clause 1. A child restraint includes a seat base adapted to rest on a vehicle seat.

Clause 2. The child restraint of clause 1, any other clause, or any suitable combination of clauses, further including a juvenile seat adapted to mount to the seat base to secure the juvenile seat to the vehicle seat.

Clause 3. The child restraint of clause 2, any other clause, or any suitable combination of clauses, wherein the seat base includes a seat-base foundation, a release handle coupled to the seat-base foundation, and a juvenile-seat retainer latch coupled to the release handle to move therewith.

Clause 4. The child restraint of clause 3, any other clause, or any suitable combination of clauses, wherein the juvenile seat is removable from the seat base by actuating the release handle to disengage the juvenile-seat retainer latch from the juvenile seat.

Clause 5. The child restraint of clause 4, any other clause, or any suitable combination of clauses, wherein the juvenile seat is separable from the seat base only when the juvenile seat is in a sideways arrangement relative to the seat base (i.e. at 90 or 270 degrees).

Clause 6. The child restraint of clause 4, any other clause, or any suitable combination of clauses, wherein the release handle is a first release handle that is coupled to a first lateral side of the seat-base foundation and the seat base further includes a second release handle that is coupled to an opposite second lateral side of the seat-base foundation so that the juvenile seat can be separated from the seat base from either side of the seat base.

Clause 7. The child restraint of clause 6, any other clause, or any suitable combination of clauses, wherein the juvenile-seat retainer latch is a first juvenile-seat retainer latch and the seat base further includes a second juvenile-seat retainer latch coupled to the second release handle.

Clause 8. The child restraint of clause 7, any other clause, or any suitable combination of clauses, wherein the first juvenile-seat retainer latch and the second juvenile-seat retainer latch are moved simultaneously to disengage the juvenile seat when only one of the first and the second release handles are actuated.

Clause 9. The child restraint of clause 8, any other clause, or any suitable combination of clauses, wherein the first release handle and the second release handle are coupled to one another by a link that is mounted to the seat-base foundation for rotation about a vertical pivot axis such that actuating one of the first and second release handles in a first direction causes the link to rotate and push the other of the first and second release handles in an opposite second direction.

Clause 10. The child restraint of clause 9, any other clause, or any suitable combination of clauses, wherein the link is biased to rotate in a direction that pulls the first release handle and the second release handle toward one another.

The invention claimed is:

1. A child restraint comprising
a seat base adapted to rest on a vehicle seat, the seat base including a perimeter rim and a seat-base foundation extending downwardly from the perimeter rim, the perimeter rim and the seat-base foundation cooperating to define a pedestal-receiving space,
a juvenile seat configured to mount selectively to the seat base to secure the juvenile seat to the vehicle seat, the juvenile seat including a seat shell formed to include a child-receiving space and a seat-shell pedestal fixed to a bottom end of the seat shell and configured to be received within the pedestal-receiving space of the seat base, and
a juvenile-seat release system including a first juvenile-seat retainer unit coupled to a first side of the seat base and arranged to engage with the seat-shell pedestal to retain the juvenile seat to the seat base, a second juvenile-seat retainer unit coupled to a second side of the seat base and arranged to engage with the seat shell pedestal to retain the juvenile seat to the seat base, and a motion-transfer link coupled to the seat base and arranged to interconnect the first and second juvenile-seat retainer units,
wherein the first and second juvenile-seat retainer units are moveable between a locked configuration, in which each of the first and second juvenile-seat retainer units are arranged to extend into the pedestal-receiving space to at least partially lie between the bottom end of the seat shell and the seat-shell pedestal to block removal of the seat-shell pedestal from the pedestal-receiving space, and an unlocked configuration, in which the first and second juvenile-seat retainer units are at least partially withdrawn from between the bottom end of the seat shell and the seat-shell pedestal so that the seat-shell pedestal is free to be removed from the pedestal receiving space upon actuation of only one of the first and second juvenile seat retainer units,
wherein the first juvenile-seat retainer unit includes a first release handle coupled to the first side of the seat base, a first pedestal-retainer latch coupled with the first release handle and adapted to engage with the seat-shell pedestal, and a first handle extension coupled with and interconnecting the first release handle and the motion-transfer link to move therewith,
wherein second juvenile-seat retainer unit includes a second release handle coupled to the second side of the seat base, a second pedestal-retainer latch coupled with the second release handle and adapted to engage with the seat-shell pedestal, and a second handle extension coupled with and interconnecting the second release handle and the motion-transfer link to move therewith,
wherein the motion-transfer link is configured to rotate about a link pivot axis between the locked configuration and the unlocked configuration in response to actuation of one of the first release handle and the second release handle, and
wherein actuation of the first release handle in a first direction radially outward from the link pivot axis causes the first pedestal-retainer latch to retract from the pedestal-receiving space.

2. The child restraint of claim 1, wherein the motion-transfer link is configured to push the second handle extension radially outward from the link pivot axis in a second direction to cause the second pedestal-retainer latch to retract radially outward out of the pedestal-receiving space with first pedestal-retainer latch.

3. The child restraint of claim 1, wherein the motion-transfer link is configured to rotate in a first circumferential direction about a link pivot axis to an unlocked position upon actuation of one of the first and second release handles away from the link pivot axis and the motion transfer-link is biased to rotate in a second, opposite circumferential direction to a locked position.

4. The child restraint of claim 1, wherein the seat-shell pedestal includes a pedestal base and at least two vertical-motion restricting flanges coupled to the pedestal base, the at least two vertical-motion restricting flanges including a first vertical-motion restricting flange circumferentially aligned with a front end of the seat shell and a second vertical-motion restricting flange circumferentially aligned with a rear end of the seat shell.

5. The child restraint of claim 4, wherein the juvenile seat is rotatable about a vertical pivot axis between a forward-facing orientation and a rearward-facing orientation, and wherein the child restraint further includes a juvenile-seat retaining system having at least one front vertical-motion restrictor and at least one rear vertical-motion restrictor configured to block removal of the seat-shell pedestal from the pedestal-receiving space when the juvenile seat is in the forward-facing orientation and the rearward-facing orientation.

6. The child restraint of claim 5, wherein each vertical-motion restrictor extends radially inward from the perimeter rim toward the vertical pivot axis to locate each associated vertical-motion restricting flange under each motion restrictor and above the seat-base foundation when the juvenile seat is in the forward-facing orientation and the rearward-facing orientation.

7. The child restraint of claim 5, wherein the seat-shell pedestal includes a circumferential-motion restrictor receiver extending axially downward and radially inward from both the first vertical-motion restricting flange and the second vertical-motion restricting flange, the seat base includes a circumferential-motion restrictor extending radially inward from the perimeter rim and is retractable with a handle of the seat base, and the at least one front vertical-motion restrictor includes a first front vertical-motion restrictor and a second front vertical-motion restrictor spaced apart circumferentially from the first front vertical-motion restrictor so that the circumferential-motion restrictor is positioned circumferentially between the first and second front vertical-motion restrictors, and wherein the circumferential-motion restrictor extends into the circumferential-motion restrictor receiver when the mounted juvenile seat is in the forward-facing orientation and the rearward-facing orientation to stop circumferential rotation of the mounted juvenile seat.

8. The child restraint of claim 1, wherein the motion-transfer link includes a rotation hub configured to rotate about a link pivot axis, a first arm extending radially outward from the rotation hub and formed to include a first pin slot, and a second arm extending radially outward from the rotation hub opposite the first arm and formed to include a second pin slot.

9. A child restraint comprising
a seat base adapted to rest on a vehicle seat, the seat base including a perimeter rim and a seat-base foundation extending downwardly from the perimeter rim, the perimeter rim and the seat-base foundation cooperating to define a pedestal-receiving space,
a juvenile seat configured to mount selectively to the seat base to secure the juvenile seat to the vehicle seat, the juvenile seat including a seat shell formed to include a child-receiving space and a seat-shell pedestal fixed to a bottom end of the seat shell and configured to be received within the pedestal-receiving space of the seat base, and a juvenile-seat release system including a first juvenile-seat retainer unit coupled to a first side of the seat base and arranged to engage with the seat-shell pedestal to retain the juvenile seat to the seat base, a second juvenile-seat retainer unit coupled to a second side of the seat base and arranged to engage with the seat shell pedestal to retain the juvenile seat to the seat base, and a motion-transfer link coupled to the seat base and arranged to interconnect the first and second juvenile-seat retainer units, wherein the first and second juvenile-seat retainer units are moveable between a locked configuration, in which each of the first and second juvenile-seat retainer units are arranged to extend into the pedestal-receiving space to at least partially lie between the bottom end of the seat shell and the seat-shell pedestal to block removal of the seat-shell pedestal from the pedestal-receiving space, and an unlocked configuration, in which the first and second juvenile-seat retainer units are at least partially withdrawn from between the bottom end of the seat shell and the seat-shell pedestal so that the seat-shell pedestal is free to be removed from the pedestal receiving space upon actuation of only one of the first and second juvenile seat retainer units, and wherein the motion-transfer link is configured to rotate about a link pivot axis and push one of the first and second juvenile-seat retainer units radially outward relative to the link pivot axis away from the pedestal-receiving space upon application of an actuation force on another of the first and second juvenile-seat retainer units such that both of the first and second juvenile-seat retainer units move simultaneously to the unlocked configuration.

10. A child restraint comprising a seat base adapted to rest on a vehicle seat, the seat base including a perimeter rim and a seat-base foundation extending downwardly from the perimeter rim, the perimeter rim and the seat-base foundation cooperating to define a pedestal-receiving space, a juvenile seat configured to mount selectively to the seat base to secure the juvenile seat to the vehicle seat, the juvenile seat including a seat shell formed to include a child-receiving space and a seat-shell pedestal fixed to a bottom end of the seat shell and configured to be received within the pedestal-receiving space of the seat base, and a juvenile-seat release system including a first juvenile-seat retainer unit coupled to a first side of the seat base and arranged to engage with the seat-shell pedestal to retain the juvenile seat to the seat base, a second juvenile-seat retainer unit coupled to a second side of the seat base and arranged to engage with the seat shell pedestal to retain the juvenile seat to the seat base, and a motion-transfer link coupled to the seat base and arranged to interconnect the first and second juvenile-seat retainer units, wherein the first and second juvenile-seat retainer units are moveable between a locked configuration, in which each of the first and second juvenile-seat retainer units are arranged to extend into the pedestal-receiving space to at least partially lie between the bottom end of the seat shell and the seat-shell pedestal to block removal of the seat-shell pedestal from the pedestal-receiving space, and an unlocked configuration, in which the first and second juvenile-seat retainer units are at least partially withdrawn from between the bottom end of the seat shell and the seat-shell pedestal so that the seat-shell pedestal is free to be removed from the pedestal receiving space upon actuation of only one of the first and second juvenile seat retainer units, wherein the seat-shell pedestal includes a pedestal base and at least two vertical-motion restricting flanges coupled to the pedestal base, the at least two vertical-motion restricting flanges including a first vertical-motion restricting flange circumferentially aligned with a front end of the seat shell and a second vertical-motion restricting flange circumferentially aligned with a rear end of the seat shell, wherein the juvenile seat is rotatable about a vertical pivot axis between a forward-facing orientation and a rearward-facing orientation, and wherein the child restraint further includes a juvenile-seat retaining system having at least one front vertical-motion restrictor and at least one rear vertical-motion restrictor configured to block removal of the seat-shell pedestal from the pedestal-receiving space when the juvenile seat is in the forward-facing orientation and the rearward-facing orientation, and wherein the juvenile seat is rotatable about the vertical pivot axis to a release orientation, in which one of the at least two vertical-motion restricting flanges is circumferentially aligned with the first juvenile-seat retainer unit and another of the at least two vertical-motion restricting flanges is circumferentially aligned with the second juvenile-seat retainer unit so that each vertical-motion restricting flange is positioned under at least a portion of the respective juvenile-seat retainer unit.

11. The child restraint of claim 10, wherein the at least two vertical-motion restricting flanges are circumferentially offset from the front vertical-motion restrictor and the rear vertical motion restrictor when the juvenile seat is in the release configuration.

12. A child restraint comprising a seat base adapted to rest on a vehicle seat, the seat base including a perimeter rim and a seat-base foundation extending downwardly from the perimeter rim, the perimeter rim and the seat-base foundation cooperating to define a pedestal-receiving space, a juvenile seat configured to mount selectively to the seat base to secure the juvenile seat to the vehicle seat, the juvenile seat including a seat shell formed to include a child-receiving space and a seat-shell pedestal fixed to a bottom end of the seat shell and configured to be received within the pedestal-receiving space of the seat base, and a juvenile-seat release system including a first juvenile-seat retainer unit coupled to a first side of the seat base and arranged to engage with the seat-shell pedestal to retain the juvenile seat to the seat base, a second juvenile-seat retainer unit coupled to a second side of the seat base and arranged to engage with the seat shell pedestal to retain the juvenile seat to the seat base, and a motion-transfer link coupled to the seat base and arranged to interconnect the first and second juvenile-seat retainer units, wherein the first and second juvenile-seat retainer units are moveable between a locked configuration, in which each of the first and second juvenile-seat retainer units are arranged to extend into the pedestal-receiving space to at least partially lie between the bottom end of the seat shell and the seat-shell pedestal to block removal of the seat-shell pedestal from the pedestal-receiving space, and an unlocked configuration, in which the first and second juvenile-seat retainer units are at least partially withdrawn from between the bottom end of the seat shell and the seat-shell pedestal so that the seat-shell pedestal is free to be removed from the pedestal receiving space upon actuation of only one of the first and second juvenile seat retainer units, wherein the first juvenile-seat retainer unit includes a first release handle, a first pedestal-retainer latch coupled with the first release handle, and a first handle extension coupled with and interconnecting the first release handle and the motion-transfer link to move therewith, wherein second juvenile-seat retainer unit includes a second release handle, a second pedestal-retainer latch coupled with the second release handle an, and a second handle extension coupled with and interconnecting the second release handle and the motion-transfer link to move therewith, wherein the motion-transfer link includes a rotation hub configured to rotate about a link pivot axis, a first arm extending radially outward from the rotation hub and formed to include a first pin slot, and a second arm extending radially outward from the rotation hub opposite the first arm and formed to include a second pin slot, and wherein each handle extension includes a handle mount fixed to each corresponding release handle for movement therewith and a motion-transfer arm coupled to and extending radially inward from the handle mount and radially aligned with a respective one of the first and second arms of the motion-transfer link, each motion-transfer arm including a motion-transfer pin extending from the motion-transfer arm into one of the first and second pin slots of the motion-transfer link.

13. The child restraint of claim 12, wherein each handle extension further includes a motion-transfer arm receiver defining a receiver channel, and wherein the motion-transfer arm of the first handle extension is received in the receiver channel of the second handle extension and the motion-transfer arm of the second handle extension is received in the receiver channel of the first handle extension so that the first handle extension and the second handle extension only move radially inward and outward relative to the first and second side of the seat base.

14. The child restraint of claim 12, wherein the first motion-transfer pin moves radially outward in a first direction upon actuation of the first release handle radially outward away from the first side of the seat base so that the motion-transfer link rotates about the link pivot axis and causes the second arm to push the second motion-transfer pin in an opposite, second direction to cause actuation of the second release handle radially outward away from the second side of the seat base.

15. A child restraint comprising
a seat base adapted to rest on a vehicle seat, the seat base including a perimeter rim and a seat-base foundation extending downwardly from the perimeter rim, the perimeter rim and the seat-base foundation cooperating to define a pedestal-receiving space, a juvenile seat adapted mount to the seat base to secure the juvenile seat to the vehicle seat, the juvenile seat including a seat shell formed to include a child-receiving space and a seat-shell pedestal fixed to a bottom end of the seat shell and configured to be received within the pedestal-receiving space of the seat base, and a juvenile-seat retainer system including at least one front vertical-motion restrictor coupled to the seat base in a fixed position at a forward end of the perimeter rim and extending into the pedestal-receiving space, and a rear vertical-motion restrictor coupled to the seat base in a fixed position at a rearward end of the perimeter rim and extending into the pedestal-receiving space, wherein the seat-shell pedestal has a length that extends in a front-to-back direction relative to the seat shell and a width that extends in a side-to-side direction perpendicular to the front-to-back direction, wherein the length is greater than the width and the juvenile seat is rotatable from a travel orientation, in which a portion of the seat-shell pedestal is arranged to lie vertically between the front and rear vertical-motion restrictors and the seat base foundation to block removal of the seat-shell pedestal from the pedestal-receiving space, and a release orientation in which a portion of the seat-shell pedestal is offset from the front and rear vertical-motion restrictors and the seat-shell pedestal is free to be removed from the pedestal-receiving space, wherein the seat-shell pedestal includes a pedestal base and at least two vertical-motion restricting flanges coupled to the pedestal base, the at least two vertical-motion restricting flanges including a first vertical-motion restricting flange circumferentially aligned with a front end of the seat shell and a second vertical-motion restricting flange circumferentially aligned with a rear end of the seat shell, wherein the juvenile seat is rotatable about a vertical pivot axis between a forward-facing orientation and a rearward-facing orientation, and wherein the seat-shell pedestal includes a circumferential-motion restrictor receiver extending axially downward and radially inward from both the first vertical-motion restricting flange and the second vertical-motion restricting flange, the seat base includes a circumferential-motion restrictor extending radially inward from the perimeter rim and is retractable with a handle of the seat base, and the at least one front vertical-motion restrictor includes a first front vertical-motion restrictor and a second front vertical-motion restrictor spaced apart circumferentially from the first front vertical-motion restrictor so that the circumferential-motion restrictor is positioned circumferentially between the first and second front vertical-motion restrictors, and wherein the circumferential-motion restrictor extends into one of the circumferential-motion restrictor receivers when the mounted juvenile seat is in the forward-facing orientation and the rearward-facing orientation to stop circumferential rotation of the mounted juvenile seat.

16. The child restraint of claim 15, further comprising a juvenile-seat release system including a first juvenile-seat retainer unit coupled to a first side of the seat base and arranged to engage with the seat-shell pedestal to retain the juvenile seat to the seat base, a second juvenile-seat retainer unit coupled to a second side of the seat base and arranged to engage with the seat shell pedestal to retain the juvenile seat to the seat base, and a motion-transfer link coupled to the seat base and interconnecting the first and second juvenile-seat retainer units, wherein the first and second juvenile-seat retainer units are moveable between a locked configuration, in which each of the first and second juvenile-seat retainer units are arranged to extend into the pedestal-receiving space and between the bottom end of the seat shell and the seat-shell pedestal to block removal of the seat-shell pedestal from the pedestal-receiving space, and an unlocked configuration, in which the first and second juvenile-seat retainer units are withdrawn from between the bottom end of the seat shell and the seat-shell pedestal so that the seat-shell pedestal is free to be removed from the pedestal-receiving space upon actuation of only one of the first and second juvenile seat retainer units.

17. The child restraint of claim 16, wherein the first juvenile-seat retainer unit includes a first release handle coupled to the first side of the seat base, a first pedestal-retainer latch coupled with the first release handle and adapted to engage with the seat-shell pedestal, and a first handle extension coupled with and interconnecting the first release handle and the motion-transfer link to move therewith, and wherein second juvenile-seat retainer unit includes a second release handle coupled to the second side of the seat base, a second pedestal-retainer latch coupled with the second release handle and adapted to engage with the seat-shell pedestal, and a second handle extension coupled with and interconnecting the second release handle and the motion-transfer link to move therewith.

* * * * *